United States Patent [19]

Stavrides

[11] Patent Number: 6,114,711
[45] Date of Patent: Sep. 5, 2000

[54] CONTACT POSITION SENSOR WITH OPTICAL FEEDBACK

[75] Inventor: Paul William Stavrides, Ivyland, Pa.

[73] Assignee: TriMark Investment Corporation, Wilmington, Del.

[21] Appl. No.: 09/022,520

[22] Filed: Feb. 12, 1998

[51] Int. Cl.[7] ..................................................... G01V 8/00
[52] U.S. Cl. ................. 250/559.33; 250/559.29
[58] Field of Search .............................. 250/208.1, 206.1, 250/227.29, 566, 559.29, 559.33; 356/375; 340/853.3, 853.6

[56] References Cited

U.S. PATENT DOCUMENTS

| 4,944,643 | 7/1990 | Lehmkuhl | 409/80 |
| 5,650,852 | 7/1997 | Chastain et al. | 356/383 |
| 5,831,734 | 11/1998 | Van Tooren et al. | 356/375 |

*Primary Examiner*—Que T. Le
*Assistant Examiner*—Thanh X. Luu
*Attorney, Agent, or Firm*—John B. Sowell-ATY

[57] ABSTRACT

A method and apparatus is provided for determining the touch down position of a tool or probe used in bonding and placement machines. The tool holder is coupled to a Z-drive motor and comprises a fixed end coupled to a resilient member. The tool holder has a compliant end connected to the other end of the resilient member. An optical encoder is coupled to the compliant end of the tool holder. Processor means are provided for incrementally driving the Z-drive motor and observing the increments of movement of the compliant end of the tool holder with an optical sensor. When the compliant end of the tool holder no longer moves in step with the encoder of the Z-drive, the tip of the tool or probe has encountered resistance and started compression of the resilient member which connects the fixed end and the compliant end of the tool holder. The Z-axis position of the encoder and the Z-drive motor at the time of resistance is indicative of the touch down position. After touch down, the resilient member may be compressed by further movement of the Z-drive motor to apply a known and predetermined bonding or placement force.

14 Claims, 6 Drawing Sheets

CONTACT POSITION SENSOR WITH OPTICAL FEEDBACK

BACKGROUND OF THE INVENTION

1. Field of the Invention

The present invention relates to position sensing in the Z-axis direction. More particularly, the present invention relates to an optical sensor capable of continuously monitoring the Z-axis position of a tool such as a pick-up tool with or without a component mounted on the tool.

2. Description of the Prior Art

Heretofore, optical micrometers have been employed to measure or gauge dimensions or parts without physically touching the part being measured. Optical sensors have also been employed to sense the size and relative position of a component after being picked up by a pick-up tool from a supply point or feeder station.

Even though the tip of the pick-up tool or the lower extremity of a component mounted on a pick-up tool is determinable by employing prior art optical sensors, the same sensor has not heretofore been employed to sense the Z-axis position of a pick-up tool as it is engaging a substrate or a component at the time of pick-up or at the time of engagement of the component with a substrate when it is being mounted or bonding onto a carrier.

Z-axis position of the top of a component, the Z-axis position of the top surfaces of the workpiece and the reference and/or datum points on a pick and place machine are not presently available without employing test instrument sensing devices.

Heretofore, pick and place machines and die attach machines (die bonders) have been provided with separate systems for sensing touch down of the tool. One type system monitors the electrical characteristics of the Z-servo drive system and/or electrical characteristics of the ultrasonic transducer and determines when a change in electrical characteristics occur that are indicative of a touchdown position. Such systems are often a part of wire bonder monitoring systems. Die bonders and pick and place machines usually employ a dedicated sensor or sensors for determining the Z-position of the bottom of a component and/or the Z-position of the substrate. Such systems may employ a plurality of sensors, none of which are fixed on or carried with the transport structure supporting the pick-up tool.

Accordingly, it would be desirable to provide in a pick and place machine or a die bonder, and other types of machines using pick-up tools, a simple and accurate optical sensor capable of determining the Z-position of reference surfaces on the machine, and/or the touch down position of the components carried by the pick-up tool.

SUMMARY OF THE INVENTION

It is a principal object of the present invention to provide an optically sensed encoder mounted on a bonding tool holder capable of accurately sensing the Z-axis position of the encoder and the bonding tool at the point of touch down position with or without a component on the tool.

It is a another principal object of the present invention to provide a highly accurate Z-axis positioning system capable of sensing the Z-axis position of every reference point on a pick and place or bonding machine for purposes of factory setup and/or calibration and recalibration in the field.

It is a another principal object of the present invention to provide an improvement or modification to existing prior art component position sensing systems to enable the existing system hardware to perform sensing of a touch down position and/or Z-position of the tool and/or component prior to placement or bonding.

It is a general object of the present invention to provide a Z-axis touch down sensing system capable of speeding up and/or enhancing component placement and/or bonding.

It is a general object of the present invention to measure the amount of squeeze out of epoxy during placement of a component being bonded to a substrate.

According to these and other objects of the present invention there is provided a pick and place and/or similar machine having a tool mounted on a resilient member which is effectively compressed when the tool engages an object. A fixed end of the resilient member is coupled to a Z-axis drive motor having a motor encoder for sensing movement of the Z-axis drive. An additional optical encoder is coupled to the tool which engages the object and is monitored during the movement of the fixed end of the resilient member by the Z-axis drive. When the optical encoder ceases to move in synchronism with the drive motor encoder, the tool has encountered resistance and has started to compress the resilient member indicative that the Z-axis touch down position has occurred. This Z-axis position can then be used for calibrating reference points and/or to enhance placement operations of components or to enhance bonding operations.

DESCRIPTION OF THE PREFERRED EMBODIMENTS

Figure 1:
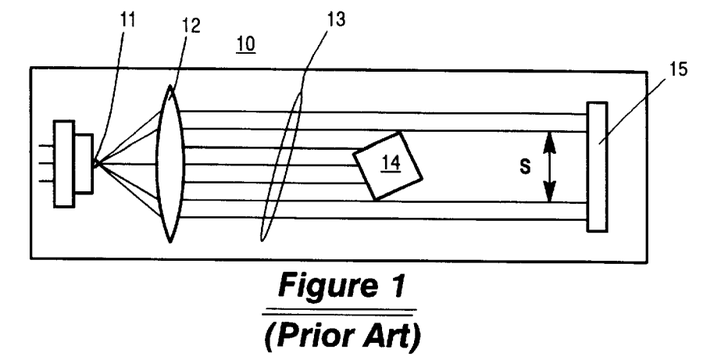
FIG. 1 is a schematic plan view of a basic prior art optical sensor or micrometer which employs a narrow beam of light and a shadow effect principal mode of operation.

Refer now to FIG. 1 showing a prior art optical sensor 10 which employs a shadow effect. There is shown an uncollimated light source 11 which projects a fan of light onto a collimating lens 12 which produces parallel rays or collimated light 13. The light is projected onto a component 14 which blocks the collimated light in the area shown as the shadow S and projects the remaining light rays onto a detector array 15. Shadow systems of this type are well known and have become increasing accurate when used in the environment of an optical micrometer.

Figure 2:
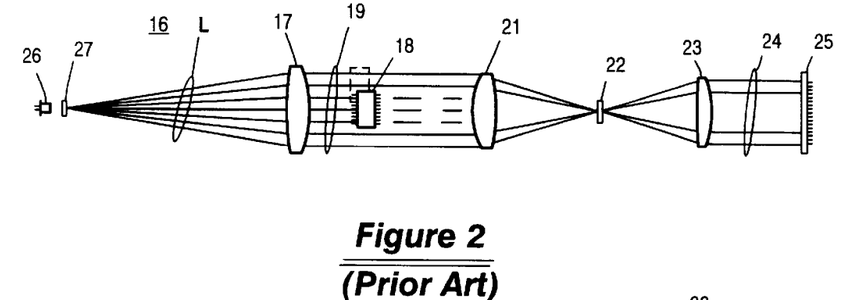
FIG. 2 is a schematic plan view of a improved prior art optical sensor which employs a broad beam of light cast on a component whose image is projected by a telecentric lens system onto a precision linear sensor such as a CCD linear array.

Refer now to FIG. 2 showing a schematic plan view of an improved prior art optical sensor 16 which employs a broad beam of light L which is collimated by a lens 17 and projected onto a component 18 for purposes of illumination. In this embodiment the field of collimated light 19 is not as crucial as in the system shown in FIG. 1. The field of light 19 being cast upon the component 18 produces unblocked light which passes through a positive objective lens 21. The positive objective lens focuses through an aperture 22 onto a positive relay lens 23 to produce a projected image 24 which is projected onto a linear array sensing element 25. The advantage of the telecentric system shown in FIG. 2 is that the component 18 is in focus regardless of its position in the field of light 19 and the refocused image 24 is not diverging but remains the same size after passing through the positive relay lens 23. This prior art system is known to be much more accurate than the shadow effect system shown in FIG. 1.

Figure 3:
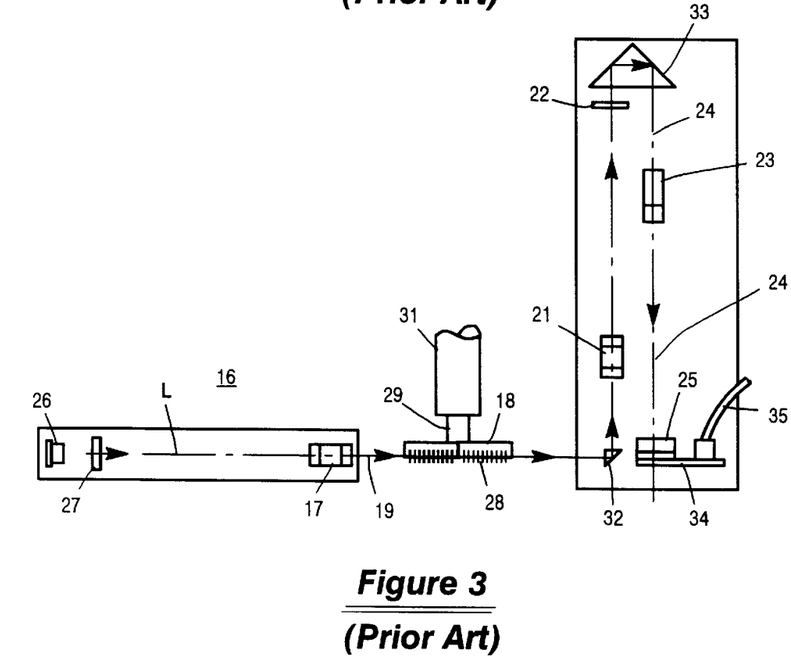
FIG. 3 is a schematic side view of the telecentric lens component positioning system shown in prior art FIG. 2.

Refer now to FIG. 3 showing a schematic side view of the telecentric lens system shown in FIG. 2. The light source 26 is shown having an optional diffuser 27 which produces the band of light L that passes through the aforementioned collimating lens 17 which casts a field of collimated light on the aforementioned component 18. The field of light 19 floods the component 18 and the leads 28 depending therefrom. The component 18 is shown being held by a pick-up tool 29 on the end of a movable tool holder 31. The positive objective lens 21 is shown receiving reflected light from the object 18 through a 90° prism 32. The positive objective lens 21 focuses the image through the aforementioned aperture 22 and its path is reversed 180° as it passes through the 180° roof prism 33. The image from the aperture 22 is projected onto a positive relay lens 23 which produces a refocused image 24 that is projected onto the linear array sensing element 25. The linear array sensing element 25 is shown mounted on a printed circuit board 34 having a connector cable 35 which connects to a computer controller and the encoders and motors as will be explained hereinafter.

Figure 4:
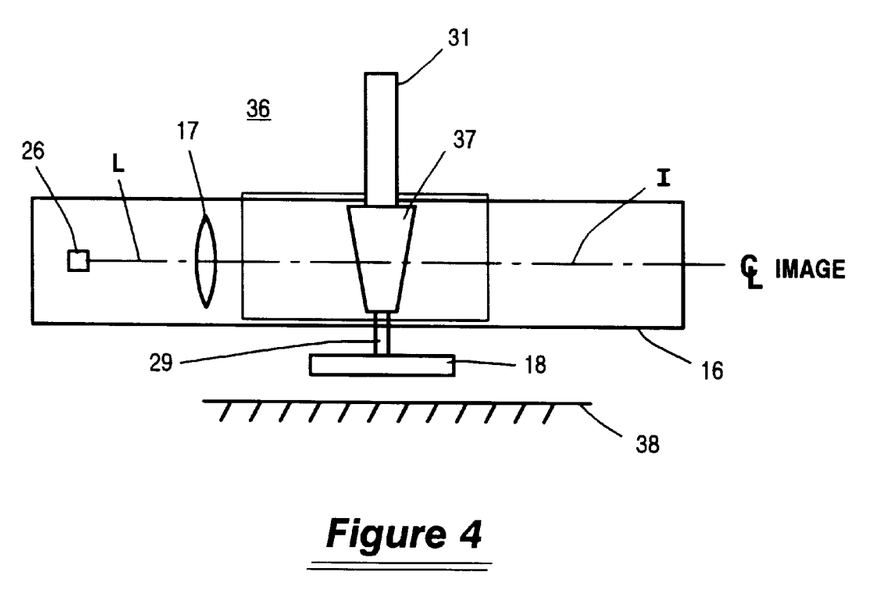
FIG. 4 is a schematic side view of the present invention encoder mounted between a tool holder and a pick-up tool and is shown located in the light or image path provided by the FIG. 1 to 3 type component positioning systems.

Refer now to FIG. 4 showing a schematic side view of the present invention system 36 which includes an encoder 37 and a pick-up tool 29 shown holding a component 18 for mounting on a substrate. When the component 18 is not present, the pick-up tool or bonding tool 29 can be used as a probe for determining the height of Z-dimension of the surface 38 whether it is part of a machine or a substrate. It will be understood that the light source 26 projects the field of light L through the collimating lens 17 onto the conical encoder 37 to form a back light which produces an image whose width at the center line of the image can be determined by the aforementioned linear array sensing element 25 employing the identical system shown in FIGS. 2 and 3. Stated differently, FIG. 4 is a schematic drawing illustrating a modified pick-up tool and holder 31 of the type which may be employed in the position sensing system shown in FIGS. 2 and 3 for accurately determining the Z-axis position of the bottom of the component 18 or the tip of the pick-up tool 29.

Figure 5:
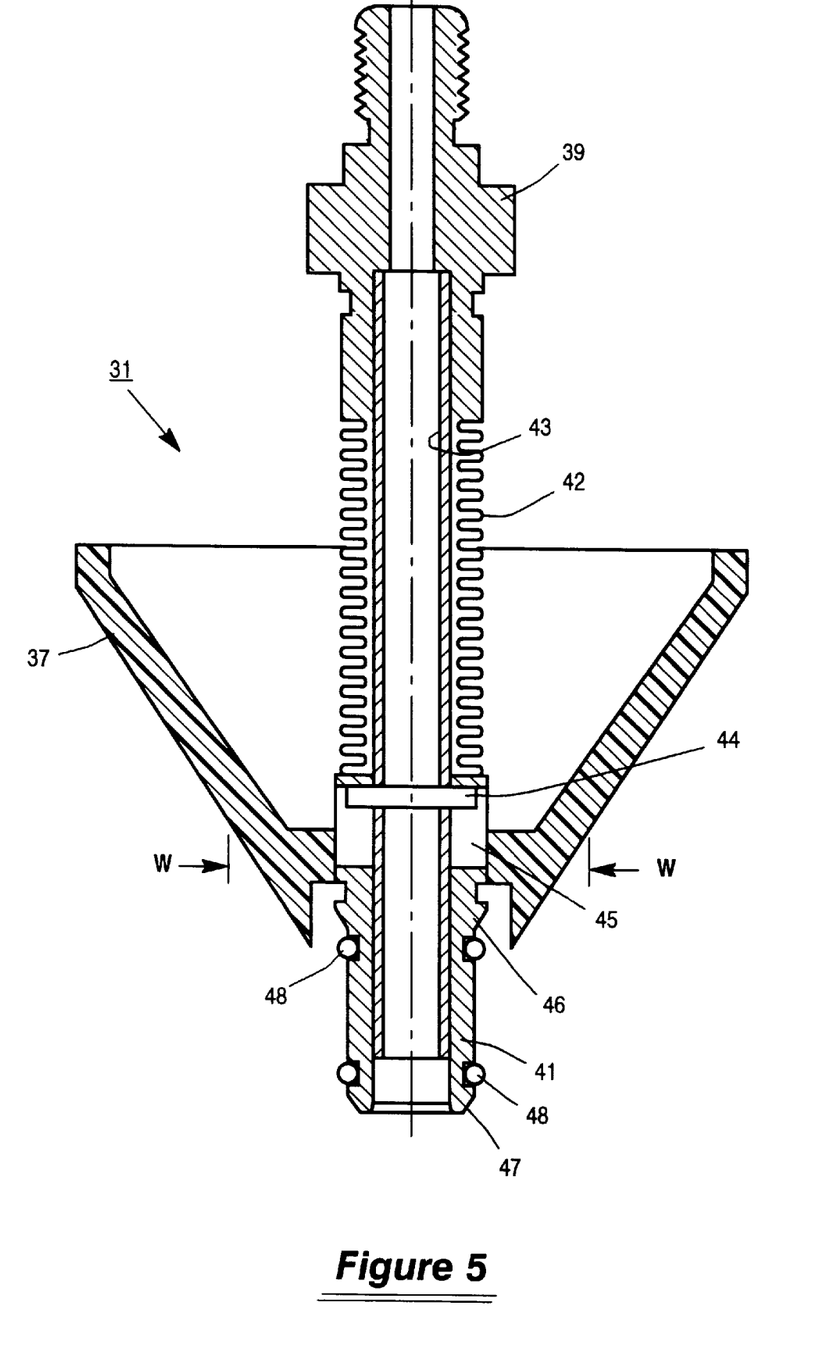
FIG. 5 is an enlarged side view in detailed section of the present invention pick-up tool holder.

Refer now to FIG. 5 showing an enlarged side view in detail of the present invention tool holder 31 on which a conical encoder 37 is preferably mounted. Tool holder 31 comprises a fixed end 39 which may be threaded for connection to the Z-drive motor (not shown). A bellows 42 is connected at its upper end to the fixed end 39 and its connected at its upper end to the fixed end 39 and is connected at its lower end to the compliant end 41 of the tool holder 31. Mounted on the upper end of the compliant end 41 is a conical encoder 37 which also covers part of the closed guide slots 45. It is not strategically important that the position of the conical encoder 37 be mounted accurately in the Z-axis because the optical sensor shown in FIGS. 2 and 3 is capable of measuring relative movement in terms of measuring relative movement in terms of width W as seen across the section of the cone to an accuracy of approximately 10 microns and is synchronized to the encoder. It will be understood that the accuracy of the Z-direction can be improved by changing the cone angle. The bellows 42 is preferably mounted under compression by an amount determined by the location of the hole in the stabilizing tube 43 for the guide pin 44. Thus, different types of tools including tab bonding tools, gang bonding tools, Z-probes as well as pick-up tools may be employed on the identical tool holder 31. One of the features of the present invention is that the tool holder 31 may be employed for experimental purposes in establishing tab bonding forces for high speed tab bonding machines. The manner in which replaceable tools are mounted on and stripped off of the compliant end 41 are well known and do not require additional explanation. In the preferred embodiment shown, the fixed end 39 of the tool holder 31 is provided with threads which screw into the Z-shaft or Z-rod of the Z-drive motor or Z-actuator of whatever type machine is used with the tool holder 31.

Figure 6:
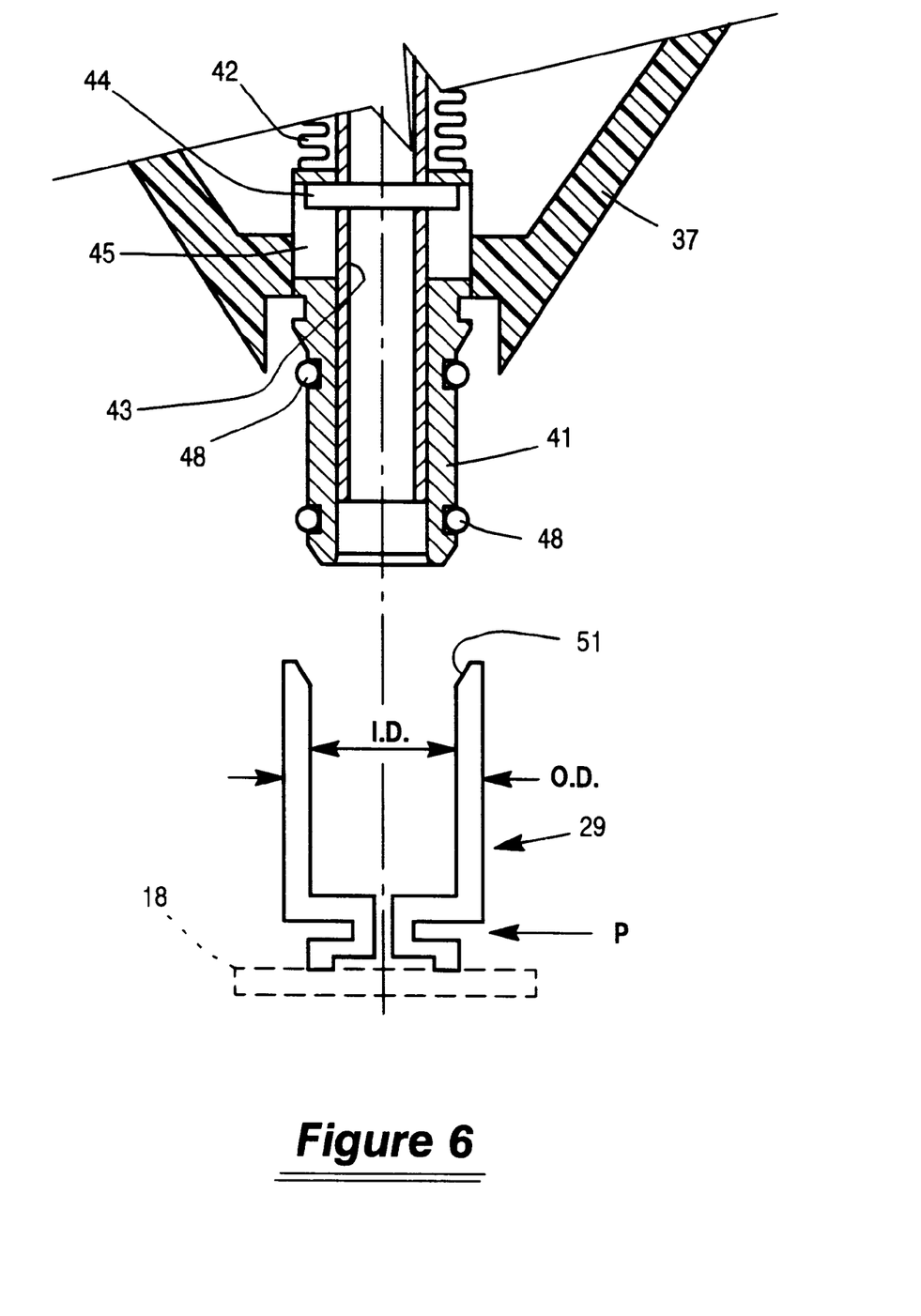
FIG. 6 is an enlarged side view in detail of a replaceable pick-up tool tip for mounting on the end of the tool holder shown in FIG. 5.

Refer now to FIG. 6 showing an enlarged side view and detail of a replaceable pick-up tool of the type which is mounted on the tool holder 31 shown in FIG. 5. The upper cylindrical portion of the tool 29 is shown having an inside diameter I.D. which fits over the 0 rings 48 and engages a tapered seat 51 onto the seat 46 shown in FIG. 5. The outside diameter O.D. is small enough to fit under the downward depending flange of the conical encoder 37. In the preferred embodiment of the present invention, the tip of the compliant end 41 does not bottom out in the pick-up tool 29. When the sensor 36 shown in FIG. 4 is positioned opposite the bottom of the tool 29, it can observe the profile shown by the arrow P. Each of the profiles of each of the tools 29 are unique, thus the sensor 36 is capable of recognizing the tool that has been picked up. The recess below the upper cylindrical portion of the tool 29 permits a stripper fork to be inserted to pull the tool 29 loose automatically. The tool may be picked up from a bin automatically as is well known in the art.

Figure 7:
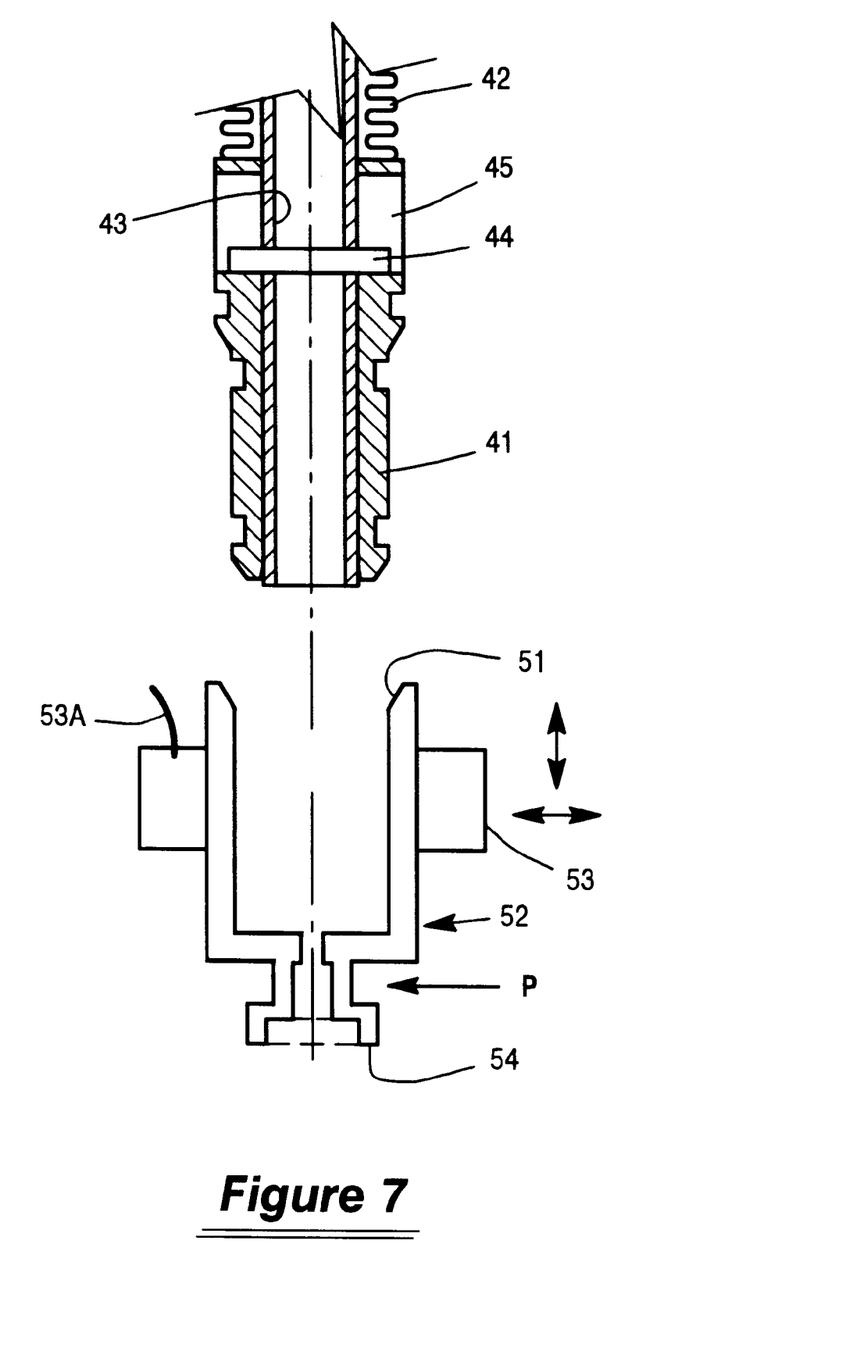
FIG. 7 is an enlarged schematic side view of a replaceable gang bonding tool tip for mounting on the tool holder shown in FIG. 5 and used for tab bonding.

Refer now to FIG. 7 showing an enlarged schematic side view of a replaceable gang bonding tool tip of the type that is used for Tape Automated Bonding (TAB) bonding. The gang bonding tool 52 has an upper cylindrical body with a tapered seat 51 and has a lower body with a profile P which is unique to the particular gang bonding tool. Gang bonding tools have a bonding face 54 and may be manufactured as a single bar, a pair of bars or four bars as shown on the tool 52. Further, it is possible to provide only a single point TAB bonding tool which may be used for either manufacturing or setting up pressures for bonding forces and/or bonding times. For TAB bonding purposes there is shown an ultrasonic vibrator 53 attached to the upper body of the bonding tool 52 and has inductively coupled power or a lead 53A attached to a power source (not shown). Tools of this type may be used for outer lead or inner lead TAB bonding, for gang bonding of beam leads and the tool may be used for flip-chip bonding when adapted to firmly hold the flip-chip. Such flip-chip devices may be provided with balls or extensions which have hemispherical shapes that can be bonded to gold or ultrasonically attached to other conductive medals. In addition, it is possible to force the balls or electrodes on a flip-chip device into a adhesive compliant tape which when compressed under the balls becomes conductive. Such tapes are used for mounting different types of devices to glass. Thus, the tool can be adapted for bonding drivers onto conductive patterns provided on the outer perimeter of active matrix panels.

Figure 8:
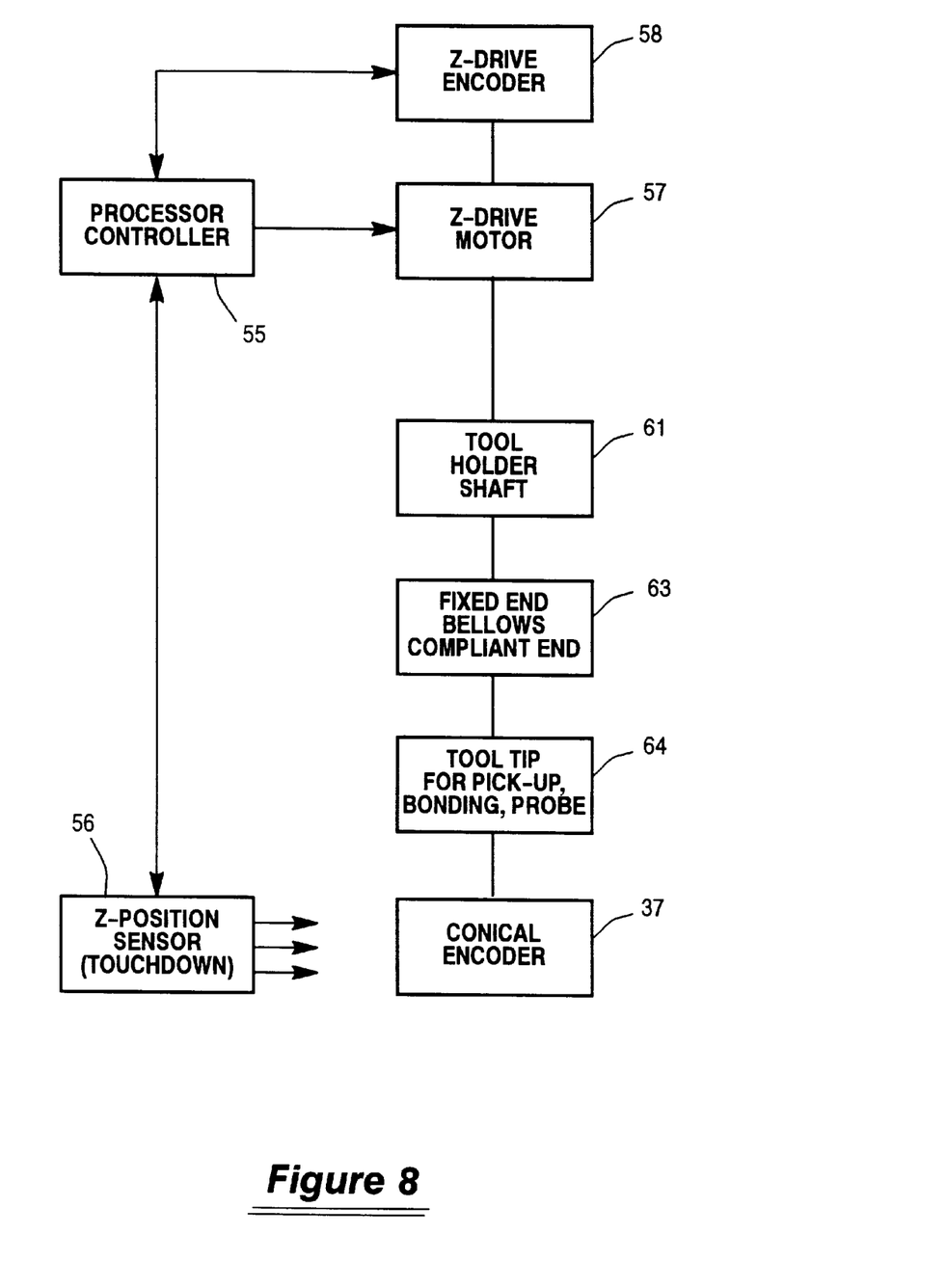
FIG. 8 is a block diagram showing the functional elements of the present invention system.

Refer now to FIG. 8 showing a block diagram of the functional mechanical and electrical elements of the preferred embodiment system. The processor controller 55 is shown electrically connected to the Z-position touch down sensor 56 of the type shown in FIG. 4 and also electrically connected to the Z-drive encoder 58. The processor controller 55 may be the systems controller but preferably is a dedicated processor controller which is capable of also driving the Z-drive motor 57. The Z-drive motor 57 is mechanically coupled to the Z-drive encoder 58 and to a tool holder shaft 61. The tool holder shaft provides the connection for the fixed end 39 of the tool 31 which is connected to the bellows portion 42 which is in turn connected to the compliant end 41. The compliant end 41 is shown in block 63 as being coupled to a tool tip 64 for pick-up, bonding or probing. Mechanically coupled to the tool 31 at the compliant end 41 is the conical encoder 37 as explained hereinbefore with reference to FIG. 5.

In a preferred mode of operation, a component 18 may be picked up from a feeder station and transferred to the sensor shown in FIG. 4. Employing the sensor shown in FIGS. 2–4 the X, Y and Theta position as well as the bottom of the component in the Z-direction may be then determined. A machine, such as a Quad Systems pick and place machine, may then transfer the component to a workpiece or substrate whose mounting positions for the different components have been predetermined. Correction for X, Y and Theta errors that occurred on pick-up are corrected on the fly before tool 29 places (or inserts) the component on a PC board or substrate. Z-position of the bottom most extension of the component may be used as a point to slow down the velocity shortly before the time of touch down. The Z-position of the conical encoder 37 is synchronized with the Z-drive encoder 58, thus, when the Z-position of the encoders 58 and 37 cease to move in step, the point of touch down is recorded by the process controller 55.

The Z-drive 57 may now be overstroked to apply a predetermined force since the bellows 42 is responsive to Hooks law and is linearly programmable into processor 55. In another mode of operation a TAB lead pattern may be positioned over a mounted device on a substrate. A multipoint or single point tool 52 may be mounted on end 41 of tool 31. Z-position of the substrate and the TAB lead finger pattern are known. After detection of touch down of the tool on top of the lead being bonded, a predetermined force and ultrasonic energy may be applied to complete the bond(s). The same mode of operation is applicable when bonding outer leads to a substrate. In this event, it is more difficult to use multipoint and/or gang bonding tools.

When bonding a die to a lead frame, the die may be connected by a utectic bonding layer or by a conductive epoxy. In either event, the knowledge of the Z-position of the die at the point of touch down will increase the speed of bonding and will enable the accurate application of bonding forces as well as monitoring with the squeeze out of epoxy by knowing the Z-position of the bottom of the die.

When bonding flip chip semiconductor devices with hemispherical shaped electrodes, the new tool has flexibility in assuring finish bonds. The tool and/or the substrate may be heated. The Z-position of the device upon touch down and subsequent Z-position and the application of a known bond force are indicative of the plastic state of the balls and are also indicative of the completion of a proper bonding operation.

It will now be apparent that a large number of different tools may be placed on the compliant end of 41 of tool holder 31 to enable detection of a touch down position of the tool as well as the monitoring of the force being applied after touch down.

It is also a feature of the present invention to employ a probe tip 29 on end 41 for use in measuring the Z-position of the Z-drive motor encoder 58 at the point of touch down on any reference plane of the machine on which the tool 31 is employed. Thus, the Z-position of the pick-up station, Z-position of the substrate or substrate carriers may be rapidly checked for purposes of calibration during manufacturing of a bonding or placement machine as well as recalibration in the field after repairs or modification.

The following six examples will explain the varied uses of the present invention tool. Further examples will be obvious using the different steps in the different examples in different combinations.

EXAMPLE I

A. Start vertical dissent of the pick-up tool
B. Read the Z-encoder
C. Move the Z-drive and the read Z-encoder
D. Did Z-encoder 37 equal the Z-drive movement
E. If yes, then continue C and D until F
F. If no, read Z-encoder 58 as the touch down position
G. Calculate the Z-axis position of the structure encountered

EXAMPLE II

A. Read encoder 37 while the chip 10 is in the sensor 26
B. Lower the pick tool
C. Sense the end engagement
D. Raise the tool to effect disengagement
E. Simultaneously read the encoders at the point of disengagement
F. Calculate touch down Z-axis position

EXAMPLE III

A. Record the Z-position of the end of the pick-up tool in space with the sensor 26
B. Pickup a component
C. Record the Z-position of the bottom of the component in space
D. Calculate the thickness of the component
E. Optional-calculate the width and length of the component
F. Determine if the component is usable
G. Place the component

EXAMPLE IV

A. Record the Z position of the end of the pick-up tool in space
B. Record the Z-position of the end of the pick-up tool when touch down on a reference point occurs
C. Calculate the Z-position of other reference points using the pick-up tool at touch down

EXAMPLE V

A. Establish the Z-position end of the pick-up tool in space
B. Record the Z-position of the end of the pick-up tool when touched down on at least two points on a workpiece
C. Record the horizontal distance between the points
D. Calculate the planarity of the workpiece

EXAMPLE VI

A. Establish the Z-position of the end of the pick-up tool in space

B. Establish the Z-position of the placement target on the workpiece
C. Establish the thickness of the component to be place on the workpiece
D. Place the component at reduced speed and/or continue Z-movement to squeeze out epoxy to a predetermined thickness Having explained several exemplary embodiments and examples, it will be understood that the novel pick-up/bonding tool is capable of determining touch down position on the fly and then applying a predetermined force with or without ultrasonic energy. Thus, the tool has numerous applications with numerous types of machines for placement and bonding.

What is claimed is:

1. Apparatus for determining the Z-axis position of a tool or probe at the time of touch down on an object comprising:

Z-drive motor means, tool holder means coupled to said Z-drive motor means, said tool holder means having a fixed end being movable by said Z-drive motor means, said tool holder means having a compliant end connected to said fixed end through a resilient member, optical encoder means coupled to said compliant end of said tool holder means, said optical encoder means comprising a fixed sensor and a movable encoder mounted on said compliant end of said tool holder, and control means coupled to said Z-drive motor means and said optical encoder means for indicating the Z-axis touch down position of said compliant end when said movable encoder ceases to move in step with said Z-drive motor means.

2. Apparatus as set forth in claim 1 wherein said Z-drive motor means comprises a calibrated motor for moving the fixed end of said tool holder means a predetermined distance in the Z-axis direction, and said control means comprising means for determining if the compliant end of said tool holder means has moved the same predetermined distance as the drive motor.

3. Apparatus as set forth in claim 1 wherein said resilient member comprises a metallic bellows.

4. Apparatus as set forth in claim 3 which further includes a stabilizing tube connected to said fixed end of said tool holder means and extending through said metallic bellows and slidably mounted into said compliant end of said tool holder.

5. Apparatus as set forth in claim 2 wherein said calibrated motor comprises means for determining the amount of movement imparted to said calibrated motor.

6. Apparatus as set forth in claim 5 wherein said calibrated motor comprises a stepper motor.

7. Apparatus as set forth in claim 1 wherein said optical encoder mean comprises component positioning means for determining component position prior to placement, and said movable encoder comprises a tapered shape member mounted on said tool holder cooperating with the component positioning means.

8. Apparatus as set forth in claim 7 wherein said tapered shaped encoder comprises a symmetrical shape having a same profile in all degrees of rotation.

9. Apparatus as set forth in claim 8 wherein said symmetrical shape comprises a cone shape.

10. Apparatus as set forth in claim 1 wherein said control means includes comparison means for comparing the Z-drive motor encoder position of said Z-drive motor means with the Z-axis position of said movable encoder, whereby observation of an inequality between the two Z-axis positions is indicative of a touch down position.

11. A method for determining the Z-axis position of a tool or probe at the time of touch down on an object, comprising the steps of:

mounting a tool holder means in the Z-axis drive means of a bonder/positioner, connecting the fixed end of the tool holder means to the Z-axis drive means for one to one movement therewith, connecting one end of a resilient member to said fixed end of the tool holder means and the other end to a compliant end of said tool holder means, mounting an encoder on the compliant end of said tool holder means, moving said tool holder means in a Z-direction to engage said compliant end of said tool holder means with an object, sensing movement of said encoder, and sensing the Z-axis position of said compliant end of said tool holder means when said encoder ceases movement in the Z-direction.

12. A method as set forth in claim 11 wherein the step of sensing the Z-axis position of said encoder further includes mounting a tapered encoder on the compliant end of said tool holder means, and employing an optical micrometer for sensing a narrow width portion of said tapered encoder which is indicative of the Z-axis position of said encoder as well as the Z-axis position of the tool or probe.

13. A method as set forth in claim 12 wherein said optical micrometer is further employed for sensing the position of a component and/or the tip of a bonding tool.

14. A method for determining the Z-axis position of a component or pick-up tool in a pick and place machine of the type having a component positioning system, characterized by the steps of:

mounting the pick-up tool on a resilient member having a fixed end and a freely movable end, said free end being effectively compressed when the pick-up tool or component engages resistance of an object;

connecting a predetermined shaped encoder for movement with the pick-up tool;

moving the fixed end of said resilient member of said pick-up tool and said shaped encoder in a vertical direction in known increments of movement;

monitoring the vertical movement of said shaped encoder;

recording the vertical position of said shaped encoder and said pick-up tool for each increment of movement of the fixed end of said resilient member, and recording the vertical position of said pick-up tool as a touch down position when said encoder ceases to move in step with the fixed end of said resilient member.

* * * * *